US006216530B1

(12) United States Patent
Shimizu et al.

(10) Patent No.: US 6,216,530 B1

(45) Date of Patent: Apr. 17, 2001

(54) COMBUSTION STATE DETECTING DEVICE FOR AN INTERNAL COMBUSTION ENGINE

(75) Inventors: Takeshi Shimizu; Koichi Okamura; Mituru Koiwa; Yutaka Ohashi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/317,168

(22) Filed: May 24, 1999

(30) Foreign Application Priority Data

Jan. 18, 1999 (JP) ........................................ 11-009700

(51) Int. Cl.[7] ........................ G01L 3/26; G01L 5/13; G01M 15/00

(52) U.S. Cl. ........................................ 73/116

(58) Field of Search ........................ 73/116, 118.1, 73/118.2, 35.07, 35.08; 324/378, 379, 381, 382, 383, 402; 123/406.12, 406.13, 406.4

(56) References Cited

U.S. PATENT DOCUMENTS 5,675,072 10/1997 Yasuda et al. .................... 73/35.08

*Primary Examiner*—William Oen

(74) *Attorney, Agent, or Firm*—Sughrue, Mion, Zinn, Macpeak & Seas, PLLC

(57) ABSTRACT

A combustion state detecting device for an internal combustion engine is obtained which is capable of preventing noises from being superimposed on an ion current, and surely obtaining a desired peak value of the ion current. The combustion state detecting device for the internal combustion engine includes an ignition coil which develops an ignition high voltage, an ignition plug to which the ignition high voltage is applied through a high-voltage path connected to a plurality of output terminals of the ignition coil, bias means for charging a bias voltage necessary for detecting ions which are discharged and generated from the ignition plug, discharge current limiting means for discharging the bias voltage, ion current detecting means for detecting the discharge of the bias voltage as an ion current that flows through the ignition plug, and an ECU for detecting a combustion state in the ignition plug on the basis of a detection value of the ion current, wherein the discharge current limiting means is disposed between an ignition current path formed by discharging the ions from the ignition plug and the bias means.

4 Claims, 4 Drawing Sheets

COMBUSTION STATE DETECTING DEVICE FOR AN INTERNAL COMBUSTION ENGINE

BACKGROUND OF THE INVENTION

1. Field of the Invention

The present invention relates to a combustion state detecting device that detects a combustion state of an internal combustion engine by detection of a change in the quantity of ions which is caused at the time of burning in the internal combustion engine, and more particularly to a combustion state detecting device for an internal combustion engine which is downsized, inexpensive and improved in the accuracy of detection.

2. Description of the Related Art

FIG. 3 is a structural diagram schematically showing a conventional combustion state detecting device for an internal combustion engine, in which power distribution is made by one ignition coil for ignition plugs of two cylinders.

In FIG. 3, an anode of a battery 1 mounted on a vehicle is connected to a lower voltage side of a primary winding 2*a* of an ignition coil 2. The other end of the primary winding 2*a* is connected to the ground through a power transistor 3 that interrupts the supply of a primary current.

Two ignition coils 2 are disposed in parallel to each other, individually, in correspondence with a pair of ignition plugs 4*a*, 4*c* and a pair of ignition plugs 4*b*, 4*d*, and the respective pairs of ignition plugs 4*a*, 4*c* and 4*b*, 4*d* are connected to both ends of the secondary windings 2*b*.

High-voltage diodes 5 are connected to one end of the respective ignition plugs 4*c* and 4*d* of the respective pairs of ignition plugs 4*a*, 4*c* and 4*b*, 4*d*, respectively, so as to apply a bias voltage identical in polarity with an ignition polarity to one end of the respective ignition plugs 4*c* and 4*d*.

The high-voltage diode 5 is provided for the purpose of protecting an ion current detecting unit 10 from an ignition high voltage which is applied to the ends of the ignition plugs 4*a* to 4*d*.

The negative pole sides of the respective secondary windings 2*b* are connected directly to the ignition plugs 4*a* and 4*b*, respectively, whereas the positive pole sides of the respective secondary windings 2*b* are connected to the ignition plugs 4*c* and 4*d* through resistors 6 for bias voltage protection, that is, for discharge current limit, respectively.

In addition, the resistors 6 are connected in parallel with ignition diodes 7 a secondary current direction of which is directed forward, respectively.

The cathodes of the respective high-voltage diodes 5 are connected to nodes between the respective resistors 6 as well as the respective ignition diodes 7 and the ignition plugs 4*c*, 4*d*, respectively.

With the above structure, in detection of an ion current, the bias voltage is applied to the ignition plugs 4*c* and 4*d* directly from one end of the high-voltage diode 5, and the bias voltage is applied to the ignition plugs 4*a* and 4*b* through the discharge current limit resistors 6 and the secondary windings 2*b*.

The ion current detecting unit 10 includes a rectifier diode D1 connected to the other ends of the primary windings 2*a*, a resistor R1 for current limit which is connected in series to the rectifier diode D1, a Zener diode DZ for voltage limit which is connected in series to the resistor R1, a rectifier diode D2 inserted between the Zener diode DZ and the ground, a capacitor C connected between both ends of the Zener diode DZ so as to be in parallel with the latter, and an output resistor R2 connected in parallel with the rectifier diode D2.

A series circuit consisting of the rectifier diode D1, the resistor R1, the capacitor C and the rectifier diode D2 is disposed between one end of the respective primary windings 2*a* and the ground so as to constitute a charging path into which a charge current flows to charge the capacitor C.

During the off state of the power transistor 3, the capacitor C is applied with a primary voltage which is a high voltage developed at the primary windings 2*a*, and charged up to a given bias voltage (about several hundreds V) by the limit voltage of the Zener diode DZ so as to function as a power supply (bias means) for detecting an ion current i. In other words, the capacitor C is charged up to an avalanche voltage of the Zener diode DZ by the primary voltage developed at the time of interrupting the primary current, to thereby ensure a bias voltage necessary for supplying the ion current.

The output resistor R2 within the ion current detecting unit 10 converts the ion current i into a voltage and inputs the voltage thus converted to an ECU 20 as an ion current detection signal Ei.

The ECU 20 made up of a microcomputer judges a combustion state of the internal combustion engine on the basis of the ion current detection signal Ei, and if the ECU 20 detects the deterioration of the combustion state, it appropriately conducts adaptive control.

Also, the ECU 20 arithmetically operates an ignition timing, etc., on the basis of drive conditions obtained from a variety of sensors (not shown), and outputs not only an ignition signal P to the power transistor 3 but also a fuel injection signal to an injector (not shown) for each cylinder, and drive signals to a variety of actuators (a throttle valve, an ISC valve, etc.).

In FIG. 3, a description will be given while attention is paid to only the paired ignition plugs 4*a* and 4*c*. The secondary current during the normal ignition control flows in a path that passes through the ignition plug 4*a*, the secondary winding 2*b*, the ignition diode 7 and the ignition plug 4*c*. Conversely, the ignition plugs 4*a* and 4*c* are applied with ignition high voltages reverse in polarity to each other.

On the other hand, during detection of the ion current immediately after the ignition control, the ion current i flows through only the ignition plug of a cylinder which has actually conducted an explosion stroke.

In this situation, since the discharge current limit resistor 6 is provided between the high-voltage diode 5 and one end of the secondary winding 2*b*, the bias voltage can be restrained from being discharged to the ignition coil 2 side at the time of starting the supply of the primary current.

In this example, in case of the circuit shown in FIG. 3, at the time of detecting the ion current, for example, the ignition plug 4*c* is applied with the bias voltage directly from one end of the high-voltage diode 5, whereas the ignition plug 4*a* is applied with the bias voltage through the discharge current limit resistor 6 and the secondary winding 2*b*.

With the above operation, an impedance of the ion current path associated with the ignition plug 4*a* in the above situation is larger than an impedance of the ion current path associated with the ignition plug 4*c* by an amount caused by the intervention of the resistor 6 and the secondary winding 2*b*. Accordingly, assuming that an ion current flows into the ignition plug 4*c* as indicated by a solid line a in FIG. 4A, an ion current smaller than the current flowing into the ignition plug 4*c* flows into the ignition plug 4*a* as indicated by a broken line b in FIG. 4A, with the result that there occurs a difference in ion current between those ignition plugs 4*a* and 4*c*.

In addition, a discharge current that flows when the charges in the capacitor C which has been positively charged are discharged to a floating capacitor Cs such as the secondary winding 2*b*, etc., which have been negatively charged flows as indicated by a solid line c in FIG. 4A.

When the resistance of the resistor 6 is small, the discharge current vibrates to make it difficult to attenuate as indicated by a solid line d in FIG. 4B, with the result that the discharge current is superimposed on the waveform of the ion current as noises.

In the conventional combustion state detecting device for an internal combustion engine, there is provided the ignition current path made up of the ignition plug, the secondary winding and the ignition plug, that is, the discharge current limit resistor and the ignition diode connected in parallel within the secondary current path as described above, and because those parts are required to withstand a voltage developed at the secondary winding when the primary current starts to flow, they must have a peak inverse voltage of about several kV or more, resulting in such a problem that the conventional combustion state detecting device becomes expensive.

Also, an insulation distance between the terminals of the parts per se needs to be elongated for obtaining high withstand voltage, as a result of which not downsized surface installed parts but large-sized lead parts are used as those parts, thereby leading to such a problem that the number of assembling processes increases to make the device expensive.

Further, there arises such a problem that a difference in ion current occurs between a pair of ignition plugs, and additionally the current flowing when the charges in the capacitor which has been positively charged are discharged to a floating capacitor such as the secondary winding, etc., which have been negatively charged vibrates with the result that the current is superimposed on the waveform of the ion current which has been discharged as noises.

SUMMARY OF THE INVENTION

The present invention has been made in view of the above problems with the conventional device, and therefore an object of the present invention is to provide a combustion state detecting device for an internal combustion engine excellent in the accuracy of detection, which is capable of restraining a difference in ion current between ignition plugs, preventing noises which are superimposed on the waveform of the ion current which has been discharged due to the vibrations of a current that flows when the charges in the capacitor which has been positively charged are discharged to a floating capacitor such as a secondary winding, etc., which have been negatively charged, and surely obtaining a desired peak value of the ion current.

According to a first aspect of the present invention, there is provided a combustion state detecting device for an internal combustion engine, comprising: an ignition coil formed of a transformer having a primary winding, one end of which is connected to a battery and the other end of which is connected to a power transistor for interrupting the supply of a primary current, and a secondary winding, for developing an ignition high voltage between both ends of the secondary winding when the supply of the primary current is interrupted; an ignition plug to which the ignition high voltage is applied through a high-voltage path connected to a plurality of output terminals of the ignition coil; bias means for charging a bias voltage necessary for detecting ions which are discharged and generated from the ignition plug upon application of the ignition high voltage; discharge current limiting means for discharging the bias voltage charged in the bias means; ion current detecting means for detecting the discharge of the bias voltage as an ion current that flows through the ignition plug; and an ECU for detecting a combustion state in the ignition plug on the basis of a detection value of the ion current; wherein the discharge current limiting means is disposed between an ignition current path formed by discharging the ions from the ignition plug and the bias means.

According to a second aspect of the present invention, there is provided a combustion state detecting device for an internal combustion engine as set forth in the first aspect of the present invention, wherein the discharge current limiting means comprises a diode a cathode side of which is connected to the secondary winding side, and a resistor connected in series to the diode.

According to a third aspect of the present invention, there is provided a combustion state detecting device for an internal combustion engine as set forth in the first or second aspect of the present invention, wherein the discharge current limiting means comprises a discharge current limit resistor, and the resistance of the resistor is set at a value within a given range which is larger than the resistance of the secondary winding.

According to a fourth aspect of the present invention, there is provided a combustion state detecting device for an internal combustion engine as set forth in any one of the first to third aspects of the present invention, wherein the bias voltage value in the bias means is set by a Zener diode located between the collector and the base of the power transistor.

BRIEF DESCRIPTION OF THE DRAWINGS

These and other objects, features and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

(First Embodiment)

Figure 1:
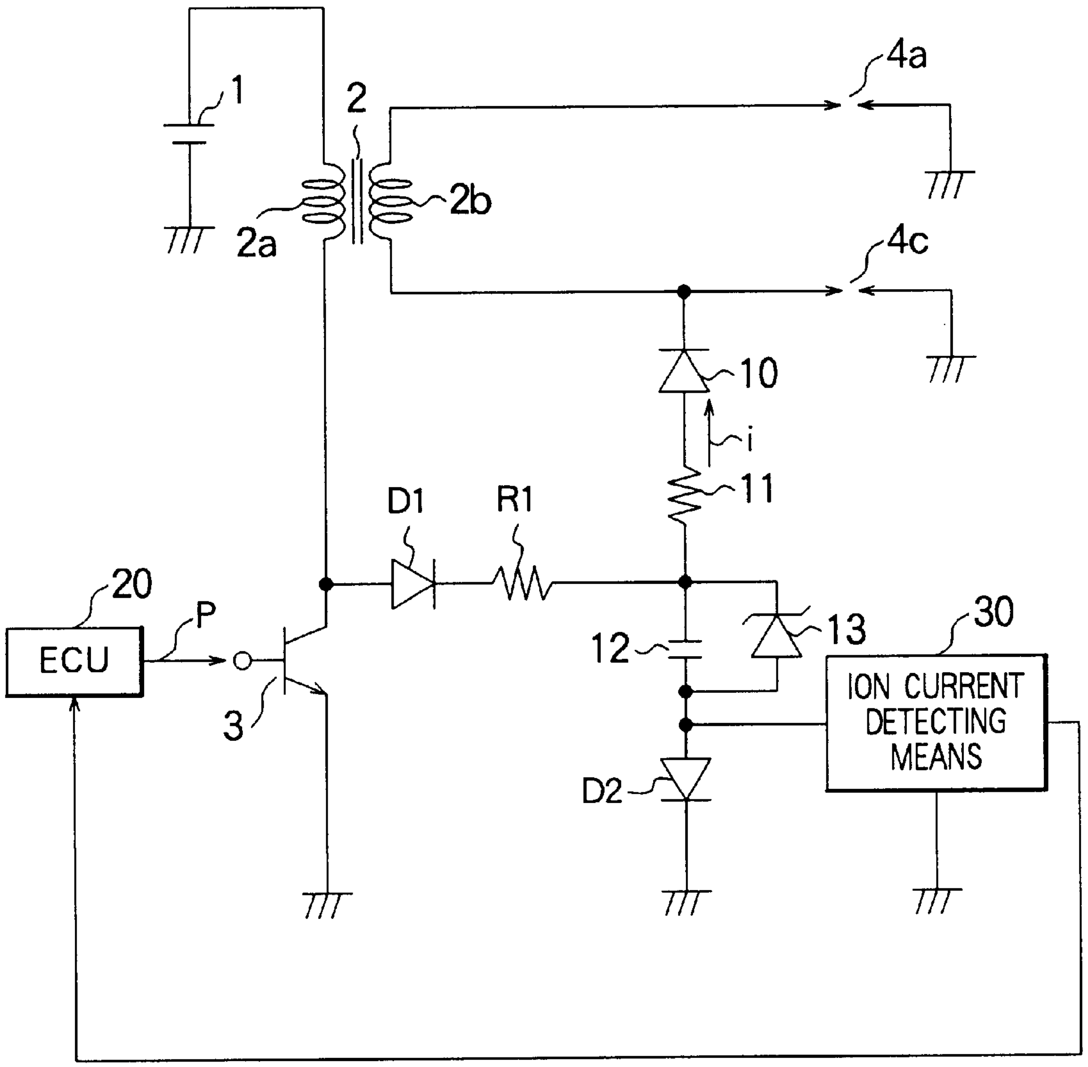
FIG. 1 is a circuit structural diagram showing a combustion state detecting device for an internal combustion engine in accordance with a first embodiment of the present invention.
Figure 3:
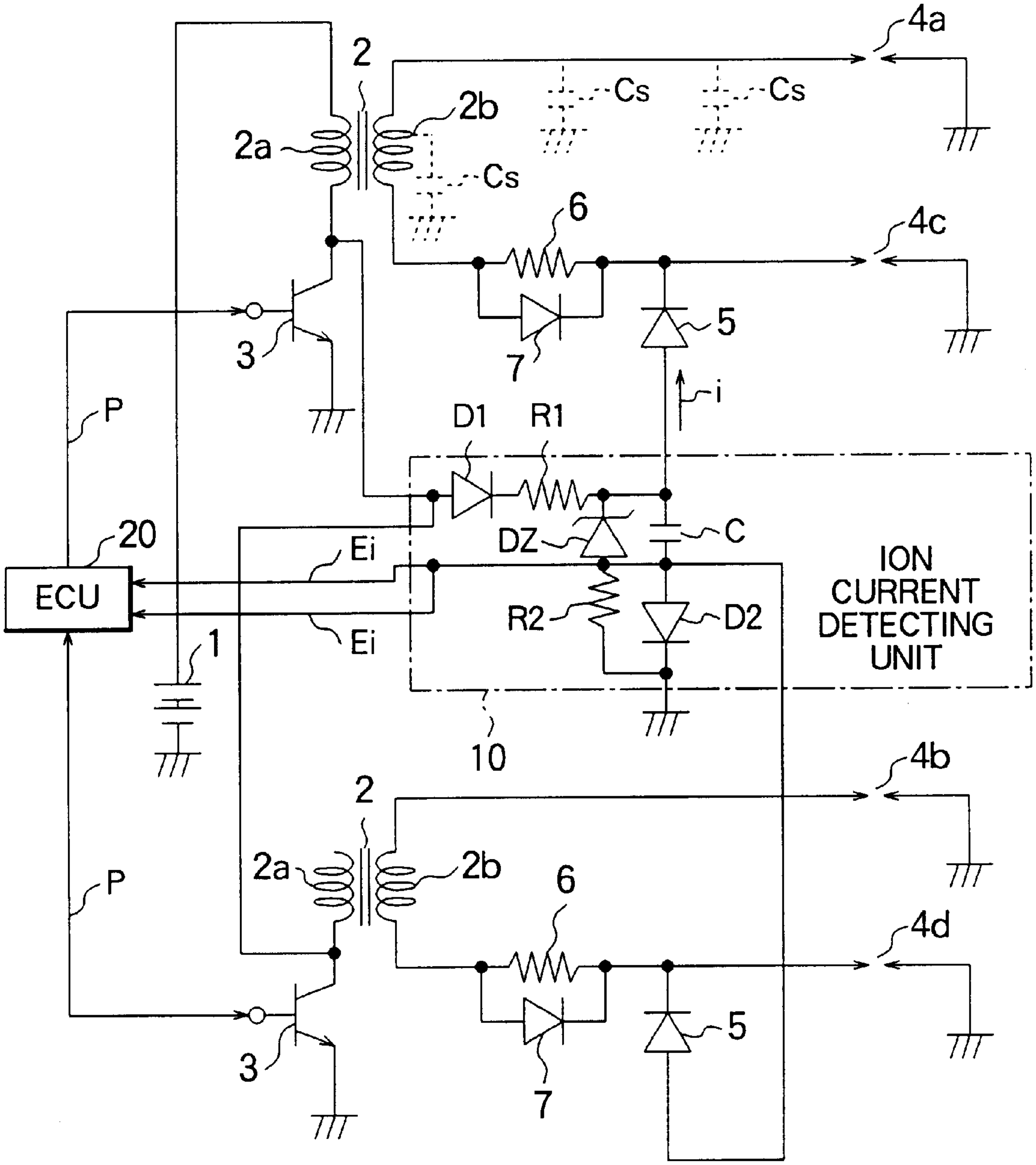
FIG. 3 is a circuit structural diagram showing a conventional combustion state detecting device for an internal combustion engine.
Figure 4A:
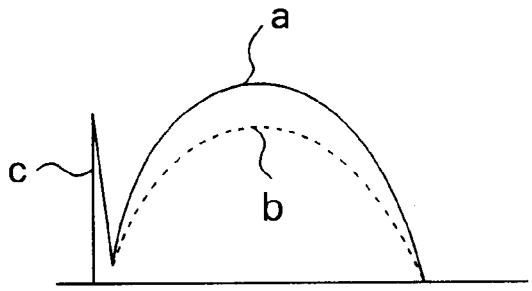
FIGS. 4A and 4B are diagrams for explanation of a problem with the conventional combustion state detecting device for an internal combustion engine.
Figure 4B:
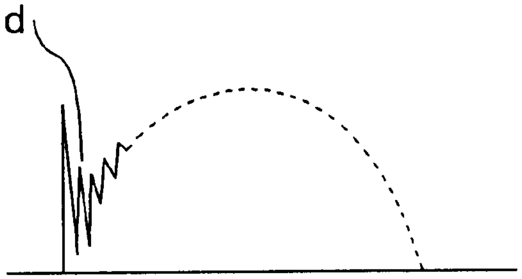

FIG. 1 is a structural diagram showing a combustion state detecting device for an internal combustion engine in accordance with a first embodiment of the present invention. In the figure, parts corresponding to those in FIG. 3 are indicated by the same references, and their duplex description will be omitted. This example is applied to a case in which one ignition coil is used to conduct power distribution for ignition plugs of two cylinders as in the case of FIG. 3, and only parts related to a pair of ignition plugs 4*a* and 4*c* are representatively shown.

In this embodiment, discharge current limiting means is located substantially not within an ignition current path but between the ignition current path and bias means. In other words, the discharge current limiting means is made up of a series circuit consisting of a current limit resistor 11 and a diode 10, and one end of the resistor 11 is connected to a capacitor 12 whereas the other end thereof is connected through the diode 10 to a node between a secondary winding 2*b* and the ignition plug 4*c* of the ignition current path.

A cathode of a bias voltage limit Zener diode 13 is connected to a node of one end of the discharge current limit resistor 11, and an anode of the Zener diode 13 is grounded to the ground through a diode D2. The bias voltage capacitor 12 is connected in parallel with the Zener diode 13. The Zener diode 13 and the capacitor 12 constitute the bias means.

An input side of ion current detecting means 30 is connected to the anode of the Zener diode 13, and an output side thereof is connected to an ECU 20. Other constitutions are identical with those in FIG. 3.

Subsequently, the operation of the combustion state detecting device thus structured will be described.

As usual, the ECU 20 arithmetically operates an ignition timing, etc., according to drive conditions, and supplies an ignition signal P to a base of the power transistor 3 at a desired control timing, to thereby control the on/off operation of the power transistor 3.

With the above operation, the power transistor 3 interrupts the supply of the primary current flowing in the primary winding 2*a* of the ignition coil 2 to boost the primary voltage, and also makes an ignition high voltage (for example, several tens kV) develop across the secondary winding 2*b*.

The secondary current during normal ignition control flows in a path that passes through the ignition plug 4*a*, the secondary winding 2*b* and the ignition plug 4*c* so that ignition high voltages reverse in polarity to each other are applied to the ignition plugs 4*a* and 4*c*.

On the other hand, at the time of detection of the ion current immediately after the ignition control, the ion current i flows through only the ignition plug of a cylinder which has actually conducted an explosion stroke.

In this situation, since the discharge current limit resistor 11 is disposed between the capacitor 12 and the secondary winding 2*b* at the time of starting the supply of the primary current, the discharge current is limited. Also, even in the case where a high voltage is applied to the ignition plug 4*c*, the high voltage is impeded by the diode 10, and a potential difference occurs between both ends of the discharge current limit resistor 11 by amount as large as a peak inverse voltage of the diode 10.

In this example, in case of the circuit shown in FIG. 1, at the time of detecting the ion current, for example, the ignition plug 4 is applied with the bias voltage from one end of the diode 10 through the discharge current limit resistor 11, whereas the ignition plug 4*a* is applied with the bias voltage through the discharge current limit resistor 11 and the secondary winding 2*b*.

Accordingly, an impedance of the ion current path associated with the ignition plug 4*a* in the above situation is larger than an impedance of the ion current path associated with the ignition plug 4*c* by an amount caused by the intervention of the secondary winding 2*b*. Accordingly, when the resistance of the resistor 11 is set at a value within a given range which is larger than the resistance of the secondary winding 2*b*, a difference between the ion current flowing in the ignition plug 4*c* and the ion current flowing in the ignition plug 4*a* is restrained, thereby making it possible to prevent noises from being superimposed on the ion current, and also to obtain a desired peak value of the ion current.

It is preferable that the value of the discharge current limit resistor 11 is set within a given range, for example, within a range of from 30 to 600 kΩ. That is, a lower limit of the resistance is set at a value 10 times or more of the resistance (as usual, 3 to 15 kΩ) of the secondary winding 2*b*, for example, at 30 kΩ, in order to restrain a difference between the ion currents flowing the ignition plugs 4*a* and 4*c*. Also, this means that there is prevented a phenomenon that the current flowing when the charges in the capacitor 12 which has been positively charged are discharged to a floating capacitor such as the secondary winding, etc., which have been negatively charged vibrates with the result that the current is superimposed on the waveform of the ion current which has been discharged as noises.

Also, an upper limit of the resistance of the discharge current limit resistor 11 is set at, for example, 600 kΩ, so that the discharge voltage is usually about 200 V or less, the peak value of the ion current is about 300 μA or less, and the peak value of that ion current is obtained through the resistor 11.

For example, assuming that the charge voltage of the bias voltage capacitor 12 is Ec, the ion current flowing in the ignition plug 4*a* is Ia, the impedance (resistance) of the secondary winding 2*b* is $Z_2$, the impedance (resistance) of the resistor 11 is $Z_{11}$ and the forward drop voltage of the diode 10 is $V_{f10}$, the ion current Ia is represented by the following expression:

$$Ia=(Ec-Vf_{10})/(Z_2+Z_{11}) \tag{1}$$

The following expression is derived from the above expression.

$$Z_{11}=\{EC-Vf_{f10})/Ia\}-Z_2 \tag{2}$$

Accordingly, the impedance $Z_{11}$ of the resistor 11 that makes it possible to supply the ion current Ia=300 μA, for example, provided that the charge voltage Ec is 200 V, the forward drop voltage $V_{f10}$, of the diode 10 is 20 V, and the impedance $Z_2$ of the secondary winding 2*b* is 3 kΩ, becomes 597 kΩ≈600 kΩ from the above expression (2), as a result of which it is found that the upper limit of the resistance of the resistor 11 is about 600 k Ω.

As described above, in this embodiment, since the series circuit consisting of the diode 10 and the resistor 11 which constitutes the discharge current limiting means is located not within the ignition current path but between the ignition current path and the bypass means, there is no necessity that the ignition current bias diode is disposed. Therefore, the withstand voltage of the discharge current limit resistor 11 can be set to be substantially lower, an element which is downsized and inexpensive can be selected, and also since the chip-type surface installed parts is substantially enabled, the number of assembling processes can be reduced as much. In addition, since the resistance of the discharge current limit resistor 11 is set at a value within a given range which is larger than the resistance of the secondary winding 2*b*, a difference in the ion current between the ignition plugs 4*a* and 4*c* can be restrained, to thereby prevent noises from being superimposed on the ion current and obtain a desired peak value of the ion current.

(Second Embodiment)

Figure 2:
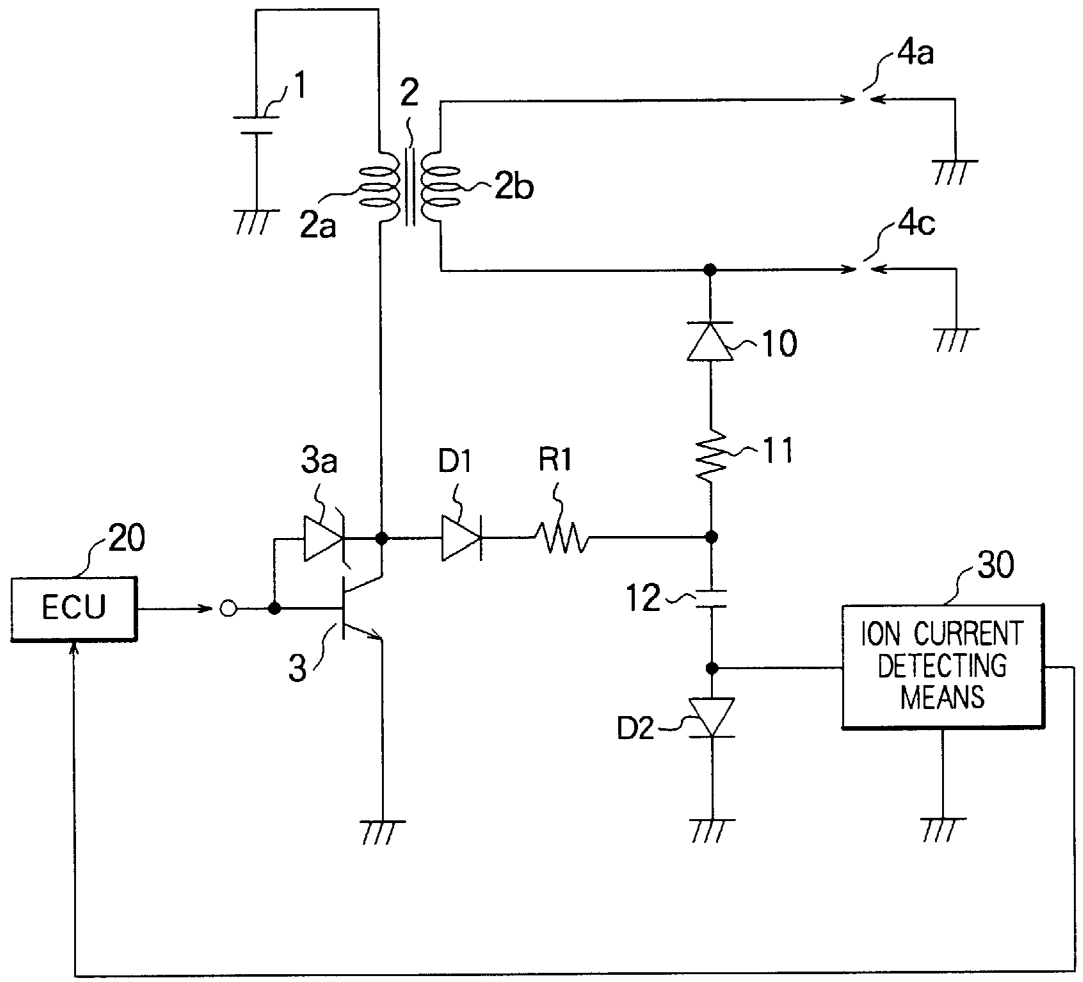
FIG. 2 is a circuit structural diagram showing a combustion state detecting device for an internal combustion engine in accordance with a second embodiment of the present invention.

FIG. 2 is a structural diagram showing a combustion state detecting device for an internal combustion engine in accordance with a second embodiment of the present invention. In the figure, parts corresponding to those in FIG. 1 are indicated by the same references, and their duplicated description will be omitted.

In this embodiment, the bias voltage limit Zener diode 13 is replaced by a Zener diode 3*a* which is normally connected between the collector and the base of the power transistor 3.

In other words, the Zener diode 3*a* is made up of a Zener diode usually disposed in order to prevent the breakdown of the power transistor 3 when a voltage of several hundreds V is applied to the collector of the power transistor 3 provided for interrupting the supply of the primary current. In this example, the avalanche voltage of the Zener diode 3*a* is set at a voltage corresponding the bias voltage of the capacitor 12 that constitutes the bias means. Other structures are identical with those in FIG. 1.

Subsequently, the operation of the combustion state detecting device thus structured will be described.

Because a voltage developed at the primary side of the ignition coil 2 when the supply of the primary current to the ignition coil 2 is interrupted by the power transistor 3 is limited by the avalanche voltage of the Zener diode 3*a* which is substantially set at a value corresponding to the bias voltage, the bias voltage capacitor 12 is charged by the same voltage as that in FIG. 1 without being applied with the avalanche voltage or more. Other operation is identical with that in FIG. 1.

As described above, in this embodiment, since the Zener diode normally connected between the collector and the base of the power transistor is used also as the bias voltage limit Zener diode, there are advantageous in that no Zener diode connected in parallel with the bias voltage capacitor is required so that the number of parts is reduced as much, and the costs are lowered, in addition to the advantage obtained by the above first embodiment.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A combustion state detecting device for an internal combustion engine, comprising:

an ignition coil formed of a transformer having a primary winding, one end of which is connected to a battery and the other end of which is connected to a power transistor for interrupting the supply of a primary current, and a secondary winding, for developing an ignition high voltage between both ends of said secondary winding when the supply of said primary current is interrupted;

an ignition plug to which said ignition high voltage is applied through a high-voltage path connected to a plurality of output terminals of said ignition coil;

bias means for charging a bias voltage necessary for detecting ions which are generated as a result of discharging in said ignition plug upon application of said ignition high voltage;

discharge current limiting means for discharging the bias voltage charged in said bias means;

ion current detecting means for detecting the discharge of said bias voltage as an ion current that flows through said ignition plug; and an ECU for detecting a combustion state in said ignition plug on the basis of a detection value of said ion current;

wherein said discharge current limiting means is disposed between an ignition current path formed by discharging in said ignition plug and said bias means.

2. A combustion state detecting device for an internal combustion engine according to claim 1, wherein said discharge current limiting means comprises a diode a cathode side of which is connected to said secondary winding side, and a resistor connected in series to said diode.

3. A combustion state detecting device for an internal combustion engine according to claim 1, wherein said discharge current limiting means comprises a discharge current limit resistor, and the resistance of said resistor is set at a value within a given range which is larger than the resistance of said secondary winding.

4. A combustion state detecting device for an internal combustion engine according to claim 1, wherein the bias voltage value in said bias means is set by a Zener diode located between the collector and the base of said power transistor.

* * * * *